June 28, 1966  S. J. TEMPERATO  3,257,935
HAMBURGER BROILER
Filed Dec. 30, 1963  3 Sheets-Sheet 1
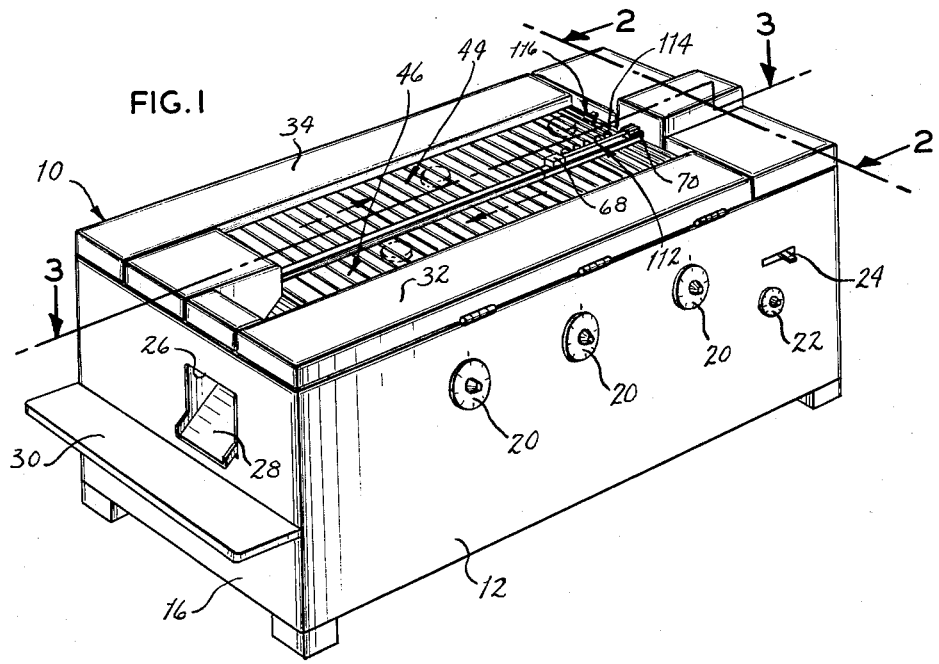
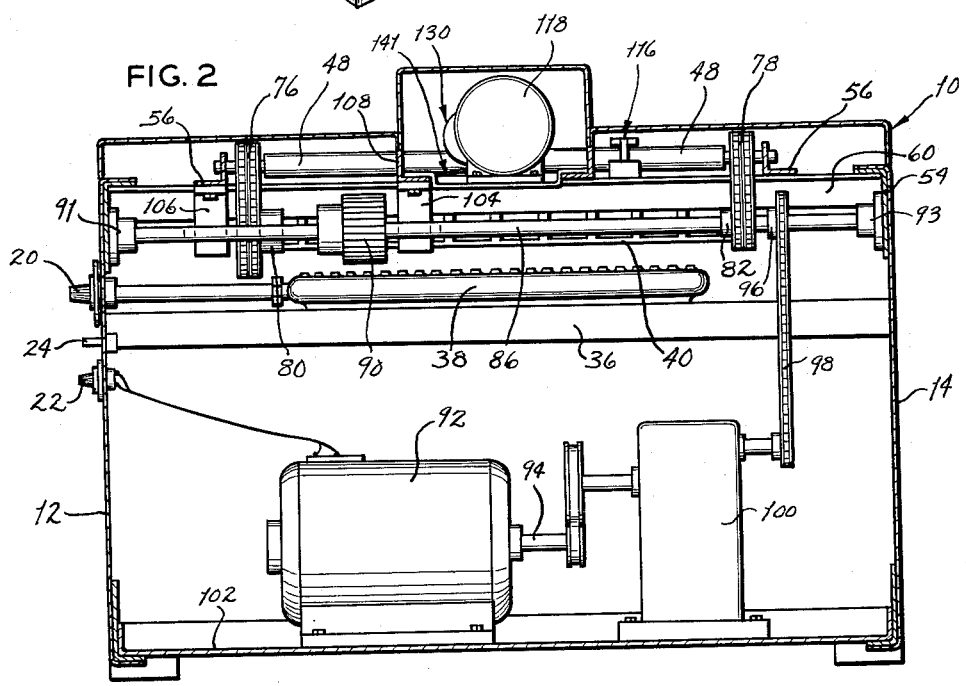
INVENTOR
SAMUEL J. TEMPERATO
BY
ATTORNEY June 28, 1966   S. J. TEMPERATO   3,257,935
HAMBURGER BROILER
Filed Dec. 30, 1963   3 Sheets-Sheet 2
FIG. 3
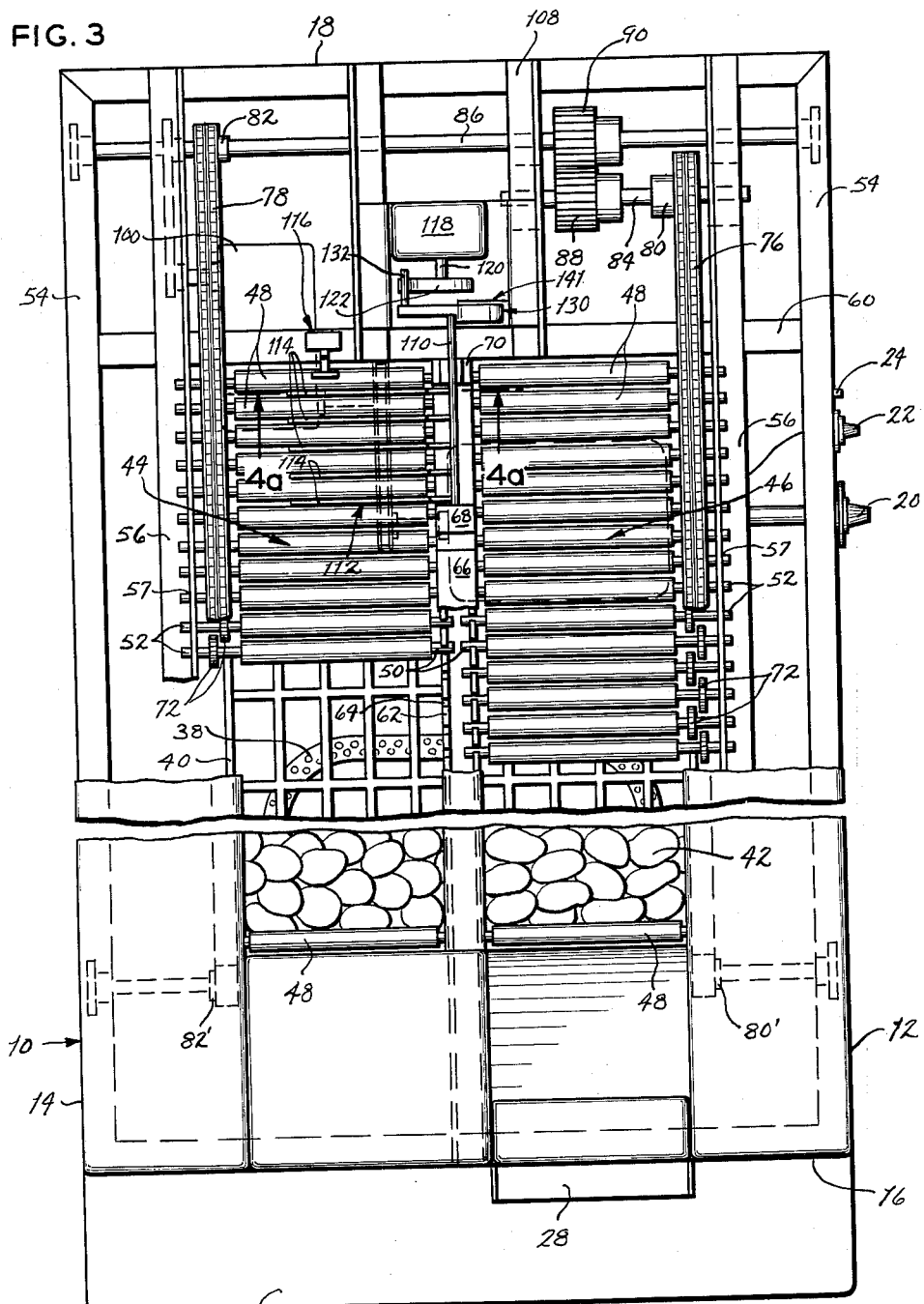
INVENTOR
SAMUEL J. TEMPERATO
BY
ATTORNEY June 28, 1966  S. J. TEMPERATO  3,257,935
HAMBURGER BROILER
Filed Dec. 30, 1963  3 Sheets-Sheet 3
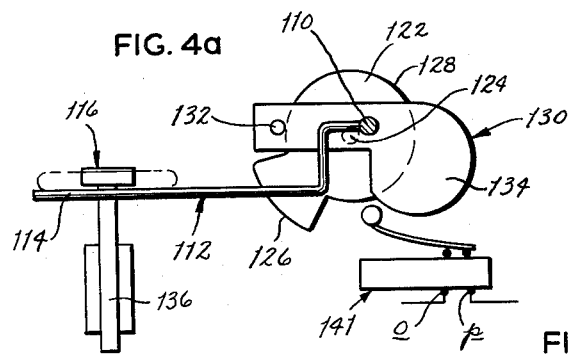
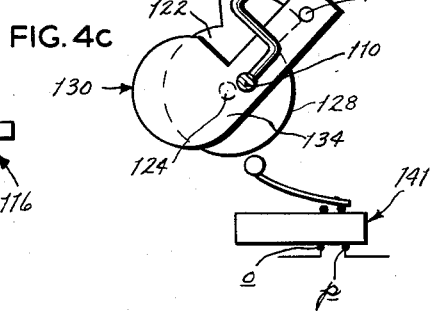
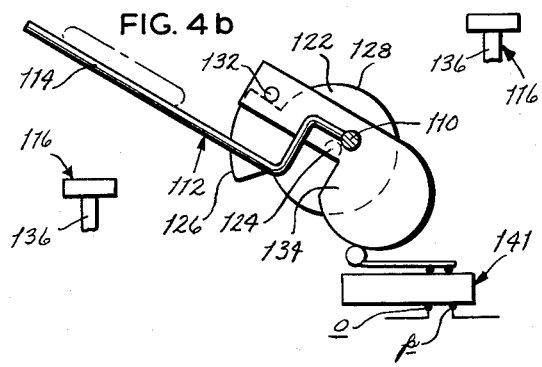
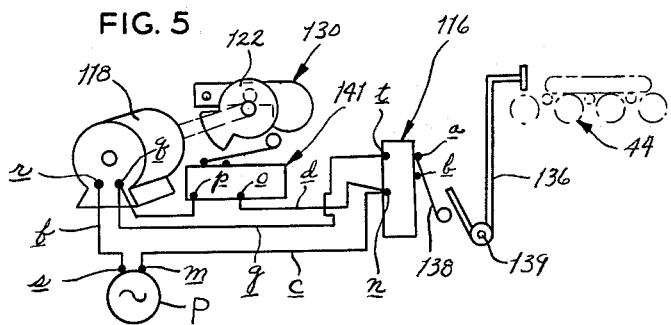
INVENTOR
SAMUEL J. TEMPERATO
BY
ATTORNEY United States Patent Office 3,257,935
Patented June 28, 1966

3,257,935
HAMBURGER BROILER
Samuel J. Temperato, 4 Ladue Manor, Ladue, Mo.
Filed Dec. 30, 1963, Ser. No. 334,182
12 Claims. (Cl. 99—386)

The present invention relates to food-preparing apparatus and more particularly to an improved broiler which automatically conveys hamburgers and like foods, which must be broiled first on one side and then on the other, over the broiler heating elements.

In the field of food preparation dealing particularly with the broiling of hamburgers, steaks, and the like, it has been the general practice to employ screen-mesh conveyors to transport the food between upper and lower heating elements of an oven. Although such devices have served the purpose, they have not proved satisfactory under all conditions of service, one of the reasons being the considerable difficulty experienced in cleaning such screen-mesh conveyors. Such a broiling operation employs heating elements positioned above and below the conveyor thereby obscuring the food while it is being cooked. Since the food must pass through the entire oven, it is all cooked to the same degree. Also, hamburgers broiled by this method tend to stick to the conveyor because they occupy the same position on the conveyor throughout the broiling operation. Furthermore, because such conveyors travel in only one direction, considerable space is required to install them.

The general purpose of this invention is to provide an automatic food broiler which embraces all the advantages of similarly employed broilers, and possesses none of the aforedescribed disadvantages. To attain this, the present invention contemplates a unique conveyor and turnover mechanism arrangement, wherein a first set of fixed axis rollers conveys the food in one direction over the broiler heating elements, a turnover mechanism spaced between the rollers lifts the food from the first set of rollers and deposits it, un-broiled side down, on a second set of similar rollers. This second set of rollers is positioned adjacent to the first set and conveys the food back over the broiler heating elements.

An object of the present invention is the provision of a novel food broiler which permits observance of the food during the broiling operation.

Another object is to provide a unique food broiler which occupies a minimum amount of space and facilitates cleaning of the broiler parts which contact the food during the broiling operation.

A further object of the invention is the provision of a hamburger broiler which automatically conveys hamburgers over a heating element; permitting grease to drip therefrom and impart a smoked flavor to the hamburgers.

Still another object is to provide an automatic food broiler which conveys the food over a broiler heating element and insures automatic and positive turnover of the food without damage thereto.

Yet another object of the present invention is the provision of a food broiler which permits broiling of food in smoke vapors produced by grease drippings therefrom, and wherein the time for broiling of the food may be selectively and uniformly controlled.

In the present invention these purposes (as well as others which will become apparent herein) are achieved generally by providing a food broiler having a heating element and transporting apparatus for the food. This transporting apparatus includes first and second parallel conveyors extending longitudinally in a plane overlying the heating element. The first and second conveyors are comprised of spaced rotatable members having fixed axes perpendicular to the direction of travel of said conveyors whereby the upper traces of the rotatable members establish a support plane for food placed thereupon. In addition, the transporting apparatus includes a turner having lifting members recessed below the plane of support and spaced between the rotatable member at one end of the first conveyor. The turner is rotatable about an axis parallel to the direction of travel of the conveyors and is free to rotate through an arc sufficient to lift the food from the first conveyor and deposit it on the second conveyor. Means are also provided for actuating the turner when conveyed food is positioned above it. Additional powering means impart rotary movement to the rotatable means to transport the food along the conveyors.

Utilization of the invention will become apparent to those skilled in the art from the disclosure made in the following description of a preferred embodiment of the invention, as illustrated in the accompanying drawings, in which:

FIG. 1 is a perspective view of the hamburger broiler of the present invention illustrating the elements which together preesnt, in effect, a conveyor surface, the turnover mechanism (retracted), the front wall with the control switches, and the discharge side wall;

FIG. 2 is a cross-sectional view taken through the hamburger broiler of FIG. 1 as indicated by the line 2—2 and illustrating principally the drive mechanism for powering the conveyors of the hamburger broiler;

FIG. 3 is a broken plan view of the hamburger broiler of FIG. 1 with certain components removed to reveal the internal structure thereof;

FIGS. 4a–4c are sequential end view sketches of the fork-like turner and its offset-axis shaft as it is rotated by the coaction of an engagement crank and a driving cam; and FIG. 5 is a sketch of the electrical connections between the turnover mechanism motor and the switches which control the actuation of the motor.

Referring now to the drawings, wherein like reference characters designate like or corresponding parts throughout the several views, there is shown in FIG. 1 a hamburger broiler having an upright, box-like housing, generally designated 10. The housing 10 is preferably conventional stainless steel used in the construction of food preparation apparatus. This housing consists of a front wall 12, a rear wall 14, and two opposite side walls 16 and 18, respectively. The rear wall 14 and side wall 18 are uninterrupted plane sheets, while the front wall 12 is provided with heater dials 20, a rheostat dial 22, and an "on-off" switch 24. The side wall 16 is provided with an opening 26 through which the lower end of a sloping discharge ramp 28 outwardly protrudes. Below the opening 26 and integral with the side wall 16 is a support ledge 30 upon which trays may be placed to receive hamburgers discharged from the hamburger broiler.

The housing walls, hereinabove described, define a generally open top which is partially covered along the front and rear walls 12, 14 by hinged top utility surfaces 32 and 34, respectively. These utility surfaces 32 and 34 are hinged to the front and rear walls 12 and 14 so that during the operation of the hamburger broiler they cover certain moving parts, to be described hereinafter. For cleaning and servicing, these surfaces swing outwardly about their hinges to permit ready access to the parts positioned thereunder.

Referring now to FIG. 2, there is shown a framework member 36 secured to the front and rear walls 12, 14 upon which heating elements 38 are mounted. Preferably these heating elements are gas burners spaced apart from one another along the length of the hamburger broiler. The heater dials 20 control the supply of gas from a gas source (not shown) to these heating elements 38. Positioned directly above these heating elements 38 and secured to the walls of the housing 10 is a grate structure 40 carrying a bed of ceramic, heat radiating briquettes 42 which direct the heat uniformly upward from the bed.

Referring now to FIG. 3 there is shown, overlying the heat radiating briquettes 42, the food transporting apparatus of the present invention. This food transporting apparatus includes two parallel and adjacent conveyors, generally designated 44 and 46, which present the moving surface by which foods, such as hamburgers, are passed over the heating elements 38 and heat radiating briquettes 42. Each of the conveyors 44 and 46 consist of spaced apart rotatable members 48. Each conveyor extends longitudinally in the common plane of the axes of rotation of the rotatable members 48; thus, the upper traces of the members 48 are preferably fixed stainless steel axis rollers having a diameter chosen from a range of about one-half inch to approximately one inch. These rotatable members 48 have smaller diameter inner and outer ends 50 and 52, respectively, which are supported for rotation, as now will be described.

As can be seen from FIGS. 2 and 3, a horizontally extending wall flange 54 is mounted to the walls of the housing 10 and supports the cross-sectional L-shaped framework members 56 thereupon. The framework members 56 extend the length of the hamburger broiler and have a plurality of annular openings 57 spaced along their vertical extending wall to receive the outer ends 52 of the rollers 48. These openings are preferably of substantially larger diameter than the outer ends 52. Another framework member 60 extends from the front wall 12 to the rear wall 14 of the housing 10 and is also mounted on the framework flange 54. A cross-sectional U-shaped rail member 62 having a plurality of grooves 64 along each vertically extending leg is located midway between the front and rear walls of the housing and extends horizontally therealong. Each rail member 62 is mounted at its ends to the framework member 60 and framework flange 54. The inner ends 50 of the rotatable members 48 are supported within the grooves 64. A shielding strip 66, mounting pillow blocks 68 and 70 is provided to cover the grooved, U-shaped rail member 62. The grooves 64, the U-shaped rail member 62, and the annular holes in the framework member 56 are spaced so that there is a gap which ranges from about one-fourth to one-sixth of the diameter of the rollers 48. It has been determined that such roller diameter and spacing is adequate to prevent the hamburgers from lodging or being drawn down between the rollers, yet permit the grease to drip from the hamburgers. By so positioning the inner and outer ends 50 and 52 of the rotatable members 48 they are free to rotate about axes which are perpendicular to the direction of travel of the food passed thereover.

Electro-mechanical means are provided to impart rotation to the rollers 48. These means include the sprocket wheels 72, the dual section chains 76 and 78, the sprocket wheels 80 and 82, the laterally-extending drive shafts 84 and 86, hereinafter further described, the reversing gears 88 and 90, the electric motor 92, and the rheostat 22. The sprocket wheels 72, which are of somewhat greater diameter than the rollers 48, are provided on the outer ends 52 of the rollers. Adjacent rollers 48 have their respective sprocket wheels 72 axially staggered, while the alternate rollers have their sprocket wheels in longitudinal alignment, whereby each conveyor 44 and 46 of the sets of rollers 48 have two aligned rows of sprocket wheels 72. This staggering of adjacent rollers permits the close spacing referred to hereinabove. The outer row of sprocket wheels of each roller set is engaged by the outer section of the dual section chains 76 and 78, while the inner row of each set engages the inner section of these chains. The dual section chains 76 and 78 are endless loop chains which engage the sprocket wheels 80 and 82 at one end of the housing 10 and the sprocket wheels 80' and 82' at the other end.

The main drive shaft 86 is journaled by bearings 91 and 93 to the front and rear walls 12 and 14. It extends horizontally across the housing 10 in close proximity to the side wall 18. Intermediate the ends of the drive shaft 84, additional bearing supports 104 and 106 depend from the framework members 56 and 108 to aid in supporting the shaft. The sprocket wheel 80 is mechanically coupled to the main drive shaft 86 through the reversing drive shaft 84 and reversing gears 88 and 90. The sprocket wheel 82 is directly connected to the main drive shaft 86, which in turn is coupled to the output shaft 94 of the electric motor 92 by a sprocket wheel 96, a linking chain 98, and a conventional speed reduction unit 100. The electric motor 92 is adapted to be connected to an electrical power source (not shown) and may be controlled in its operation by means of the rheostat 22. The electric motor 92 and the speed reduction unit 100 are mounted upon a heat reflecting base sheet 102 which is secured to the walls of the housing 10.

Turner means, best seen in FIGS. 1, 3 and 4, are also provided so that when the hamburgers have reached the end of the conveyor 44, they may be turned over and deposited on the conveyor 46. This turner means, therefore, has an axis of rotation parallel to the direction of travel of the hamburgers over the conveyor and rotates through an arc sufficient to lift the food from the first conveyor and deposit it on the second conveyor. The pillow blocks 68 and 70 have an annular hole and cradle-like groove, respectively, to receive the shaft 110 of the fork-like turner generally designated 112. This permits the turner to be removed from the pillow blocks for cleaning. The fork-like turner 112 has tines 114 which (in retracted position) extend horizontally outward from the shaft and then curve downward to be recessed below the upper traces of the rollers 48. These tines 114 are spaced between the rollers 48 at one end of the conveyor 44 so that a hamburger which progresses to the end of this conveyor will actuate switch 116, thereby initiating the arcuate turnover movement of the fork-like turner 112.

Means for actuating and executing the turnover movement of the fork-like turner 112 include an electrical motor 118 which drives an output shaft 120. The electrical motor 118 is connected to a source of electrical power (not shown), whereby mechanical power is developed at its output shaft 120 and conveyed to power transmitting means to actuate the fork-like turner 112.

Power transmitting means are utilized to mechanically couple the output shaft 120 to the shaft 110 of the fork-like turner 112. This means includes a cam 122 which is rotatable about a center axis 124 and has a peripheral portion 126 radially outward of the remainder of its periphery 128.

The shaft 110 of the fork-line turner 112 is radially offset from the rotational axis 124 of the cam 122. Mounted on one end of the shaft 110 is a turner-operator part, generally designated 130, which has a crank portion 132 radially offset from the shaft 110. The crank portion 132 extends parallel to the shaft 110 and toward the cam 122 sufficiently to permit them to engage so that rotation of the cam 122 may be transmitted to the fork-like turner 112. The turner operator part 130 also has a counterbalance weight portion 134 positioned radially outward from shaft 110 to resist rotational forces applied thereto, as will be described hereinafter.

This means utilized to energize the electric motor 118 when a hamburger is positioned above the fork-like turner 112, can best be seen with reference to FIGS. 3-5. The switch, generally designated 116, consists of a mechanical actuating arm 136 and a spring biased contact arm 138, see FIG. 5. The mechanical actuator 136 is pivoted at 139. Movement of the actuator arm 136 about the pivot 139 urges the spring biased arm 138 in a direction which closes the contacts $a$ and $b$. The switch 116 has one terminal $n$ connected by conductor $c$ to a terminal $m$ of an electrical power source P. The terminal n is also connected to a terminal o of another switch 141 by conductor d. The other terminal p of switch 141 is connected to a terminal q of the electric motor 118. The other terminal r of the electric motor 118 is returned to a terminal s of the power source P by conductor f. A conductor g connects the terminal q of the motor 118 to a second terminal t of the spring biased switch 116. The mechanical actuator arm 136 extends horizontally above and out over the end roller of the conveyor 44, as shown in FIGS. 1, 3 and 5. The electrical connections of the circuit elements shown in FIG. 5 position the spring biased switches 116 and 141 in series between the power source P and the electric motor 118. Each switch is in parallel with the other, however. The advantage of this circuit arrangement will become apparent from the description of the operation of the turnover mechanism.

In operation, the heating elements 38 are ignited and the broiling heat brought to the desired temperature by adjusting the heater dials 20. Depending upon the degree to which the food must be cooked, the rheostat 22 is adjusted, whereby the speed of electric motor 92 is set. This establishes the speed of the conveyors 44 and 46. The food is then placed upon the first conveyor 44 at a position along its path which will result in cooking for a desired time and extent, for example, rare, medium or well done. The shaft 94 of the motor 92 is coupled through the speed reduction unit 100 and the link chain 98 to the main drive shaft 86. As the shaft 94 turns, the chain 98 is driven and sprocket 96 rotates. The main drive 86 imparts rotation of sprocket 82 which drives the dual section chain 78. The chain 78 travels in the direction which imparts rotation to the rollers 48 so that the hamburgers are advanced toward the fork-like turner 112. Because the main drive shaft 86 drives the second conveyor 46 through the reversing gears 88 and 90, the rollers 48 making up the second conveyor 46 are rotated in the opposite direction from those of first conveyor 44. This permits the hamburgers to be returned across the heat radiating briquettes 42 and discharged by means of the ramp 28.

When a hamburger reaches the end of the first conveyor 44 and contacts the mechanical actuator 136, it closes the normally open switch 116. This permits current to flow through the switch 116 to the electric motor 118. The energization of the electric motor 118 drives the output shaft 120 and the cam 122 rotates from the position shown in FIG. 4a to that shown in FIG. 4b. As the cam 122 rotates, it enegages the crank portion 132 and carries it along with the turner-operator part 130 to that position illustrated in FIG. 4b. This movement causes the periphery of the counterbalance weight portion 134 to engage the spring biased switch 141, thereby closing it. Upon the closing of spring biased switch 141, current is permitted to flow from the power source P through the switch 141 to the electric motor 118. This continues the rotation of cam 122 which was initiated by the switch 116 and carries the end part 132 of shaft 110 to the turnover position, illustrated in FIG. 4c. At this point, the counterbalance weight portion 134 is rotated beyond its engagement position with spring biased switch 141. The arm of switch 141 springs upward and opens the electrical circuit between the power source and the electric motor 118. This action de-energizes the motor 118.

Simultaneously, because of the offset relationship of the cam 132 and the end part 130, the crank portion 132 of the end part 130 slips radially outward of the outer peripheral portion 126 of the cam 122, thereby permitting the fork-like turner 112 back to its original position illustrated in FIG. 4a.

The broiler is readily cleaned, principally by swinging outward the top utility surfaces 32 and 34 and then removing the rollers 48. By lifting the roller inner ends 50 upwardly from the grooves 64 and slipping the sprocket wheels 72 out from engagement with the dual section chains, their outer ends 52 can be removed from the larger diameter openings 57.

It may be seen from the foregoing description that the present invention permits the automatic broiling of hamburgers by transporting them over heat by a first conveyor of fixed axis rollers, turning them over by means of a positive lifting and turnover mechanism, and depositing them upon a second conveyor which returns the hamburgers over the heat to discharge them, broiled as desired.

Obviously, many modifications and variations of the present invention are possible in light of the above teachings. For example, larger sprocket wheels may be chosen such that where frozen foods are to be broiled, the first conveyor will transport the foods at a slower speed than the second conveyor in order to permit thawing on the first conveyor. Alternately, instead of the three heating elements 38, each of which are shown to heat a portion of both conveyors 44 and 46, there might be provided two longitudinal burners, one under each of the conveyors, and the heat supplied by one of these burners to its associated conveyor being independent of the heat supplied by the other burner to its conveyor. It is therefore to be understood that, within the scope of the appended claims, the invention may be practiced otherwise than as specifically described.

I claim:
1. In an improved broiler for food
   a heating element, and
   transporting apparatus for the food, comprising
   first and second parallel conveyor means extending longitudinally in a plane overlying the heating element,
   said first and second conveyor means including spaced rotatable members having fixed axes perpendicular to the direction of travel of said conveyor means,
   the upper traces of said rotatable members establishing a support plane for food placed thereupon,
   turner means having lifting members recessed below said plane of support established by said rotatable members and spaced between the axes thereof at one end of said first conveyor means,
   said turner means having a rotational axis which is parallel to the direction of travel of said first and second conveyor means,
   said turner means further being rotatable through an arc sufficient to lift the food from said first conveyor and transfer it to said second conveyor,
   means operatively connected to said turner means for actuation thereof when conveyed food reaches a position thereabove, and
   powered means to impart rotary movement to the rotatable members of said first and second conveyor means.
2. The improved food broiler of claim 1, wherein
   said first and second conveyor means are positioned adjacent to each other, and
   said powered means comprise
   variable means mechanically connected to said rotatable members of said first and second conveyor means for imparting variable speed rotation thereto in opposite directions.
3. In an improved automatic broiler for food
   an upright open-top housing
   a heating element mounted within said housing, and
   transporting apparatus for the food, comprising
   first and second adjacent sets of fixed axes rollers rotatably mounted within said housing and above said heating element,
   said first and second sets extending longitudinally in the same plate with the rotational axes of said rollers transverse to the longitudinal dimension of said first and second sets of rollers,
   said rollers of each set further being spaced apart with the upper traces thereof establishing a support plane for food placed thereupon, pillow block means affixed to said housing and positioned between said first and second sets of rollers, a fork-like turner mounted on said pillow block means and having an axis of rotation parallel to the longitudinal dimension of said first and second sets of rollers, said fork-like turner having tines recessed below the support plane and spaced between the axes of said rollers at one end of said first set, said fork-like turner further being rotatable through a predetermined arc sufficient to lift the food conveyed by said first set of rollers and transfer it to said second set of rollers, means operatively connected to said fork-like turner for rotation when the food is conveyed thereabove by said first set of rollers, and means mechanically connected to said rollers for rotation thereof so that the food placed thereupon is conveyed toward and away from said fork-like turner by said first and second sets of rollers, respectively.

4. The improved food broiler of claim 3, wherein each of said rollers of said first and second sets have sprocket wheels of greater diameter than said rollers attached thereto, adjacent rollers having said sprocket wheels positioned thereon in axially staggered relationship and alternate rollers having said sprocket wheels positioned in longitudinal alignment, thereby to permit close spacing of the rotatable rollers and present inner and outer aligned rows of sprocket wheels for each of said sets.

5. The improved food broiler of claim 4, wherein the diameter of said rollers is in the range of from about ½" to 1" and the spacing between the rollers is in the range of from about one-fourth to one-sixth of this diameter.

6. The improved food broiler of claim 5, wherein said means for rotating said first and second sets of rollers comprise first and second dual section chains, said chains forming endless loops, one section of said first and second chains engaging the outer row of said aligned sprocket wheels and the other section engaging the inner row of said aligned sprocket wheels, a first electrical motor having an output shaft and adapted to be connected to a source of electrical energy, and means mechanically connected to said dual section chains and said output shaft for driving said first and second chains in opposite directions.

7. The improved food broiler of claim 6, wherein said means for rotating said first and second sets of rollers further comprise a rheostat electrically connected to said first motor for controlling the speed thereof.

8. The improved food broiler of claim 3, wherein said means for rotating said fork-like turner comprise a second electrical motor having an output shaft and adapted to be connected to a source of electrical energy, and first and second power transmitting means for mechanically coupling said output shaft to said fork-like turner, one of said power transmitting means being connected to said output shaft and the other being connected to said fork-like turner, said first power transmitting means being a cam having a central rotational axis, said second power transmitting means being a shaft axially set off from the rotational axis of said cam and having a radially offset engagement crank for engaging said cam, whereby said set off relationship between said shaft and said cam effects disengagement of said power transmitting shaft and said cam through a predetermined arc.

9. The improved food broiler of claim 8, wherein a counterbalance weight is attached to said shaft of said second power transmitting means to resist rotation of said fork-like turner and return it to its recessed position upon disengagement of said first and second power transmitting means.

10. The improved gas-fired broiler of claim 9, wherein said means for rotating said fork-like turner further compises a first normally open spring biased switch having a mechanical actuator lever which extends above and in close proximity to said support plane of said first set of rollers to permit said first switch to be closed by food contacting said lever thereof, said first switch being electrically connected in series with said second electrical motor and its source of electrical energy, a second normally open spring biased switch having a mechanical actuator lever yieldably urged against said counterbalance weight, said second switch being closed by movement of said weight, said second switch further electrically connected between said second electrical motor and its source of electrical energy and in parallel with said first switch whereby said motor is energized by the food closing said first switch, maintained energized by counterbalance weight closing said second switch, and de-energized and rotated back to its recessed position when said shaft of said second power transmitting means and said cam are disengaged.

11. An improved gas-fired broiler for automatically broiling steaks and the like, comprising an upright housing including front, rear, and opposite side walls, substantially horizontally extending gas burner means supported within said housing, horizontally extending grate means overlying said burner means, a bed of heat radiating means overlying said grate means and supported thereby for radiating uniformly upwardly heat received from said burner means, first and second parallel conveyor means extending horizontally and overlying said heat radiating means for transporting the steaks placed thereupon toward and away from one side wall of said housing respectively, said first and second conveyor means having rotatable means, the upper traces of which define a support surface to the steaks, said rotatable means being spaced to permit grease drippings therefrom to fall upon said heat radiating means, turnover means recessed below said support plane and positioned between said spaced apart rotatable means for automatically lifting partially broiled steaks from said first conveyor means and placing said steaks unbroiled-side downward upon said second conveyor means, means coupled to said turnover means for actuating said turnover means when a steak is positioned thereabove, and means mechanically coupled to said rotatable means of said first and second conveyor means for rotation thereof at selective speeds.

12. In an improved broiler for food a heating element mounted within said housing and below said open top, and transporting apparatus for the food, comprising first and second conveyor means extending logitudinally in a plane overlying said heating element, pillow block means affixed to said housing and positioned between said first and second conveyor means, turner means cradled within said pillow block means and having an axis of rotation which extends parallel to the longitudinal direction of said conveyor means, said turner means being rotatable through a predetermined arc sufficient to lift food conveyed by said first conveyor means and transfer it to said second conveyor means, an electrical motor having an output shaft and adapted to be electrically connected to a source of electrical energy, first and second power transmitting means for mechanically coupling said output shaft of said electrical motor to said turner means, one of said power transmitting means being mechanically connected to said output shaft and the other being mechanically coupled to said turner means, said first power transmitting means being a cam which is rotatable about a center axis, said cam having a peripheral portion which extends radially outward from the remainder of the periphery, said second power transmitting means being a shaft axially set off from said center axis of said cam and having a radially offset engagement arm for engaging the periphery of said cam, a counterbalance weight attached to said axially set off shaft of said second power transmitting means, a first normally open spring biased switch having a mechanical actuator lever which extends above and in close proximity to said first conveyor means, said first switch being electrically connected to said electrical motor and adapted for serial connection with a source of electrical energy.

a second normally open spring biased switch having a mechanical actuator lever yieldably urged against said counterbalance weight, said second switch being electrically connected to said electrical motor and adapted for serial connection with a source of electrical energy.

References Cited by the Examiner
UNITED STATES PATENTS

| | | | |
|---|---|---|---|
| 1,869,539 | 8/1932 | Brand | 99—423 |
| 2,076,479 | 4/1937 | O'Connell. | |
| 2,185,979 | 1/1940 | Dumas | 99—423 |
| 2,641,177 | 6/1953 | Finizie | 99—422 |
| 2,898,846 | 8/1959 | Del Francia | 99—443 |

WALTER A. SCHEEL, *Primary Examiner.*